United States Patent [19]

Shibuya et al.

[11] Patent Number: 5,275,978
[45] Date of Patent: Jan. 4, 1994

[54] COLORED CRYSTALLIZED GLASS ARTICLE AND METHOD FOR PRODUCING THE SAME

[75] Inventors: Takehiro Shibuya; Takashi Sakane; Yoshio Hashibe, all of Shiga, Japan

[73] Assignee: Nippon Electric Glass Company, Limited, Shiga, Japan

[21] Appl. No.: 4,663

[22] Filed: Jan. 14, 1993

Related U.S. Application Data

[63] Continuation-in-part of Ser. No. 742,573, Aug. 7, 1991, abandoned, which is a continuation of Ser. No. 282,397, Dec. 9, 1988, abandoned.

[30] Foreign Application Priority Data

Dec. 11, 1987 [JP] Japan ................. 62-314789

[51] Int. Cl.$^5$ .................. C03C 1/06; C03C 10/04
[52] U.S. Cl. ........................ 501/5; 501/17; 501/70; 501/71
[58] Field of Search ......... 501/4, 5, 17, 70, 71, 501/72, 8

[56] References Cited

U.S. PATENT DOCUMENTS

| | | | |
|---|---|---|---|
| 3,754,881 | 8/1973 | Petticren | 501/5 X |
| 3,761,235 | 9/1973 | Yamanaka et al. | 65/33 |
| 3,955,989 | 5/1976 | Nakamura | 501/5 |
| 3,964,917 | 6/1976 | Nakamura | 501/5 |
| 5,066,524 | 11/1991 | Baba et al. | 501/4 X |

FOREIGN PATENT DOCUMENTS

| | | | |
|---|---|---|---|
| 3329382 | 1/1974 | Fed. Rep. of Germany | 501/5 |
| 0039884 | 10/1978 | Japan | 501/5 |

OTHER PUBLICATIONS

*American Ceramic Society Bulletin*, vol. 56, No. 2, pp. 213–218 (1977).
*American Ceramic Society Bulletin*, vol. 68, No. 1, p. 81, (1989).
*American Ceramic Society Bulletin*, vol. 62, No. 9, p. 1001 (1983).
Berry et al, *Minerology*, W. H. Freeman and Co., (1959) p. 562 definition of sphene.

*Primary Examiner*—Karl Group
*Attorney, Agent, or Firm*—Kurt Kelman

[57] ABSTRACT

A crystallized glass article having a surface pattern like granite, marble or other natural stones with a line pattern of a desired color or colors, which is formed by fusion bonding small masses of a crystallizable glass material mixed with inorganic pigment powder at a heat-treating temperature higher than the softening point. The surface pattern comprises crystallized glass areas defined by the small masses in the surface layer of the article and the colored line pattern defined by the pigment dispersed in the interfaces between adjacent ones of the small masses in the surface layer.

6 Claims, 1 Drawing Sheet

COLORED CRYSTALLIZED GLASS ARTICLE AND METHOD FOR PRODUCING THE SAME

This is a continuation-in-part of copending application Ser. No. 07/742,573 filed on Aug. 7, 1991, now abandoned, which is in turn a continuation of Ser. No. 282,397 filed Dec. 9, 1988, now abandoned.

BACKGROUND OF THE INVENTION

1. Field of the Invention

The present invention relates to crystallized glass articles having surface patterns imparting to them an appearance such as granite, marble or other natural stones which are adaptable for use as heat resistant, incombustible ornamental wall materials for buildings and the like, and in particular, to such crystallized glass articles having a desired color or colors.

2. Description of the Prior Art

As substitution of natural marble for ornamental building materials, crystallized glass articles have been proposed which have great mechanical strength, excellent heat resistance and excellent efflorescence resistance.

U.S. Pat. No. 3,761,235 (Reference 1) discloses crystallized glass articles having marble-like appearance. The crystallized glass article is produced by heat-treating a crystallizable $CaO\text{-}Al_2O_3\text{-}SiO_2$ glass, which essentially consists of 15–40 wt % CaO, 3–35 wt % $Al_2O_3$, and 40–75 wt % $SiO_2$.

U.S. Pat. No. 3,964,917 (Reference 2) discloses another crystallized glass articles which is also provided with marble-like appearance. The crystallized glass is produced by heat treating a crystallizable $CaO\text{-}Al_2O_3\text{-}SiO_2\text{-}ZnO$ glass after shaping the glass into a desired shape. The crystallizable $CaO\text{-}Al_2O_3\text{-}SiO_2\text{-}ZnO$ glass essentially consists of 50–65 wt % $SiO_2$, 3–13 wt % $Al_2O_3$, 15–25 wt % CaO, 2–10 wt % ZnO.

U.S. Pat. No. 3,955,989 (Reference 3) discloses a crystallized glass article having a surface pattern like granite, marble or other natural stones which is formed by heat-treatment of collected small crystallizable glass masses. Each of the small masses precipitates needle-like $\beta$-wollastonite crystals by the heat-treatment which extend from the surface of the small mass into the interior in a direction generally perpendicular to the surface of the small mass. Therefore, the surface pattern is defined by the small masses forming the surface layer. Reference 3 also discloses a crystallized glass article having a beautiful colored pattern by spraying or applying a solution containing coloring ions onto the collected small masses prior to the heat-treatment. The coloring ions diffuse into the small masses so that the article is colored. However, the article has only a light color. That is, it is impossible to produce an article having a bright colored or a high contrast colored pattern.

SUMMARY OF THE INVENTION

Therefore, an object of the present invention is to provide a crystallized glass article having a colored surface pattern like natural stones which is easily produced with a desired color.

Another object of the present invention is to provide a method for producing such crystallized glass article having the colored surface pattern.

According to the present invention, a crystallized glass article is obtained which consists of an integral body of individual small masses of crystallized glass. The individual small masses are fusion-bonded along interfaces by heat-treating an accumulation of the individual small masses. Powders of an inorganic pigment having a predetermined color are dispersed in the interfaces. A plurality of adjacent ones of the small masses form a surface layer of the article, each of the fusion-bonded small masses having crystals precipitated by the heat treatment whereby a colored surface pattern is imparted to the glass article. The surface pattern comprises crystallized glass areas defined by the small masses forming the surface layer and colored lines enclosing the crystallized glass areas and defined by the pigment dispersed in the interfaces.

The crystallizable glass useful herein may be the $CaO\text{-}Al_2O_3\text{-}SiO_2$ glass and the $CaO\text{-}Al_2O_3\text{-}SiO_2\text{-}ZnO$ glass disclosed in References 1 and 2.

The inorganic pigment or coloring agent should be one which retains in the interfaces between the fusion-bonded small masses without ionization even by the heat-treatment of the small masses. As such a pigment, there are NiO, $MnO_2$, CoO, $Fe_2O_3$, $Cr_2O_3$, spinel of Zn-Cr-Ni-Al oxide, sphene of Sn-Si-Ca-Cr-Zn oxide, zircon of Zr-Si-Pr oxide, zircon of Zr-Si-V-Pr oxide, zircon of Zr-Si-V oxide, spinel of Al-Co-Cr-Zn oxide, spinel of Al-Zn-Fe-Cr oxide, spinel of Fe-Cr-Zn-Al oxide, spinel of Fe-Cr-Zn oxide, spinel of Fe-Cr-Ni-Mn oxide and the like.

The crystalized glass article comprises an integral body of individual small masses of crystallized glass, the crystallized glass essentially consisting of $SiO_2\text{-}Al_2O_3\text{-}CaO\text{-}ZnO$ glass having needle-like $\beta$-wollastonite crystals precipitated by a heat-treatment.

The individual small masses are fusion-bonded along interfaces by this heat-treatment, and powders of a coloring agent with a desired color are dispersed in the interfaces, the coloring agent comprises at least one selected from NiO, $MnO_2$, CoO, $Fe_2O_3$, $Cr_2O_3$, spinel of Zn-Cr-Ni-Al oxide having grey color, sphene of Sn-Si-Ca-Cr-Zn oxide having a pink color, zircon of Zr-Si-Pr oxide having yellow color, zircon of Zr-Si-V-Pr oxide having green color, zircon of Zr-Si-V oxide having blue color, spinel of Al-Co-Cr-Zn oxide having dark blue color, spinel of Al-Zn-Fe-Cr oxide having beige color, spinel of Fe-Cr-Zn-Al oxide having reddish brown color, spinel of Fe-Cr-Zn oxide having brown color, or spinel of Fe-Cr-Ni-Mn having dark color.

The spinel of Zn-Cr-Ni-Al oxide essentially consisting of $ZnO.Cr_2O$, $ZnO.Al_2O_3$ with Ni.

The sphene of Sn-Si-Ca-Cr-Zn oxide essentially consisting of $CaO.SnO_2.SiO_2$ with $Cr_2O_3$ and ZnO.

The zircon of Zr-Si-Pr oxide essentially consisting of $ZrO_2.SiO_2$ with $Pr_6O_{11}$.

The zircon of Zr-Si-V-Pr oxide essentially consisting of $ZrO_2.SiO_2$ with $V_2O_5$ and $Pr_6O_{11}$.

The zircon of Zr-Si-V oxide essentially consisting of $ZrO_2.SiO_2$ with $V_2O_5$.

The spinel of Al-Co-Cr-Zn oxide essentially consisting of $CoO.Al_2O_3$ and $ZnO.Cr_2O_3$.

The spinel of Al-Zn-Fe-Cr oxide essentially consisting of $ZnO.Al_2O_3$, $ZnO.Cr_2O_3$ and, $ZnO.Fe_2O_3$.

The spinel of Fe-Cr-Zn-Al oxide essentially consisting of $ZnO.Fe_2O_3$, $ZnO.Cr_2O_3$ and $ZnO.Al_2O_3$.

The spinel of Fe-Cr-Zn oxide essentially consisting of $ZnO.Cr_2O_3$ and $ZnO.Fe_2O_3$.

The spinel of Fe-Cr-Ni-Mn oxide essentially consisting of $MnO.Fe_2O_3$ and $NiO.Cr_2O_3$.

A method for producing the crystallized glass article comprises steps of: preparing small masses of crystallizable glass each of which can precipitate crystals therein with softening and deformation by heat-treating at a heat treating temperature higher than the softening point of the crystallizable glass; preparing a mixture of the small masses and powdery inorganic pigment by mixing together with water; heat-treating the mixture in a mold at the heat treating temperature until the crystals are present and the small masses are fusion-bonded along interfaces between adjacent ones of the small masses to form an integral body of individual small masses, the inorganic pigment powders maintaining dispersed in the interfaces whereby the crystallized glass article is formed with a colored surface pattern defined by the small masses forming the surface layer and a color of the inorganic pigment.

An amount of the pigment is 0.1–10% of the weight of the small masses. Addition of pigment more than 10 wt % degrades the softening and flowability of the glass at the heat-treating step. Sufficient color is not obtained in use of pigment less than 0.1 wt %.

An amount of the water is 0.1–5% of the weight of the small masses. In use of water less than 0.1 wt %, the pigment can neither sufficiently be mixed with the small masses nor adheres onto surfaces of the small masses. Addition of water more than 5 wt % disadvantageously causes concentration of the pigment powder.

DESCRIPTION OF THE PREFERRED EMBODIMENTS

Figure 1:
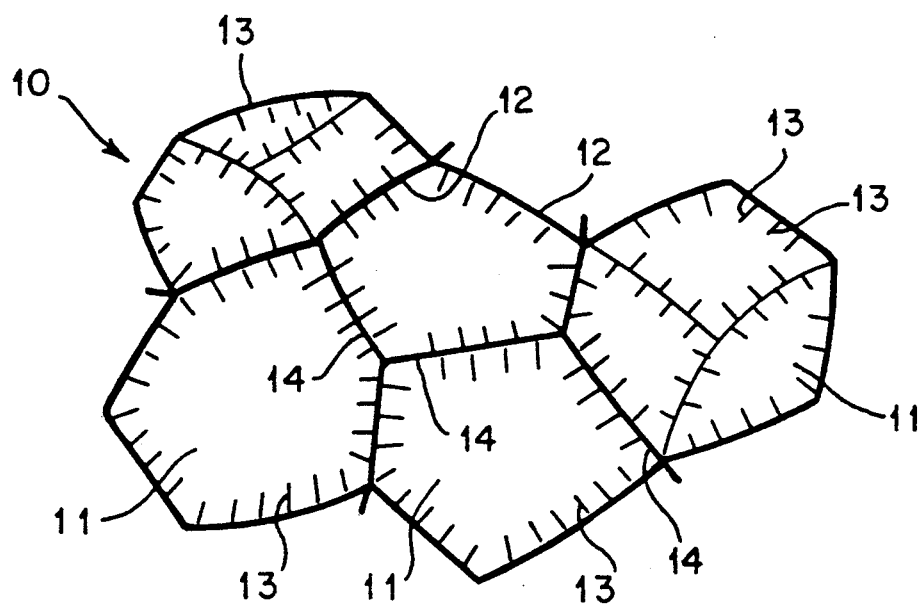
FIG. 1 is a plan view schematically illustrating a surface pattern of a crystallized article according to an embodiment of the present invention.

Referring to FIG. 1, a crystallized glass article 10 according to the present invention comprises a plurality of small masses 11 fusion-bonded to each other along interfaces 12. Each of the small masses 11 has a plurality of crystal grains, for example, needle-like $\beta$-wollastonite crystals 13. Particles of inorganic pigment powder (15 in FIG. 2) are dispersed in the interfaces 12. Thus, the article 10 has a surface pattern defined by the small masses forming the surface layer thereof and small mass interface lines 14 colored by the pigment.

In production of the article 10, small masses 11 of a crystallizable glass are prepared by melting the glass batch and pouring the molten glass into water. The small masses 11 are mixed with an inorganic pigment powder (15 in FIG. 2) of a desired color in a mixer. The mixture is put into a mold.

Figure 2:
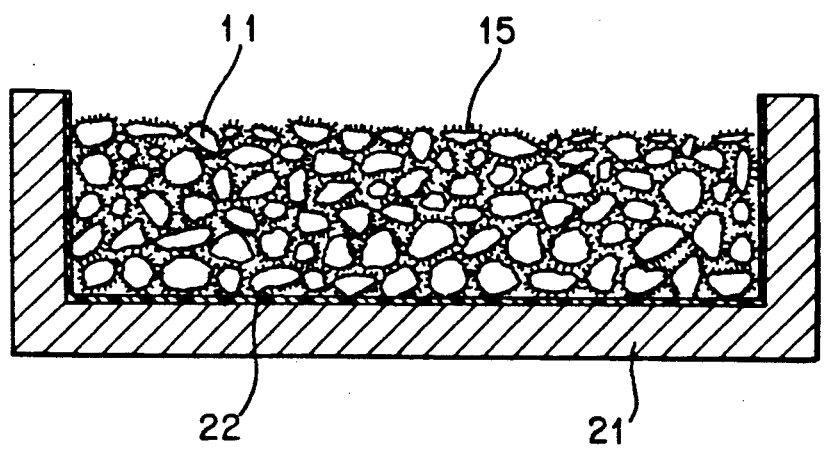
FIG. 2 is a sectional view illustrating small masses put into a mold.

Referring to FIG. 2, the mold 21 is formed of a refractory material and is provided with a mold releasing agent 22 coated onto the inner surface of the mold. Then, the mixture are heated at a temperature of the softening point of the glass so that the small masses 11 are fusion-bonded along the interfaces with crystal grains precipitating in each small mass. The pigment 15 are dispersed in the interfaces. Thus, the crystallized article are produced.

EXAMPLE 1

A glass batch consisted, by weight, of $SiO_2$ 59.0%, $Al_2O_3$ 6.8%, CaO 19.1%, $K_2O$ 1.7%, $Na_2O$ 1.7%, $B_2O_3$ 0.6%, ZnO 6.8%, and BaO 4.3%. The glass batch was melted at 1400°–1500° C. and poured into water to form small masses of the glass having an average particle size of about 1 mm. After the small masses were dried, the small masses were mixed with Sn-Si-Ca-Cr-Zn sphene pigment of 2 wt % and water of 2 wt % on the weight base of the small masses in a mixer for about 5 minutes. The mixture was put into the mold with the mold releasing agent coating of alumina powder and was heat-treated at 1100° C. for one hour, following which cooling was conducted. During the heat-treatment, the small masses were softened, deformed and fusion-bonded to form an integral body with a smooth outer surface. In each small mass, needle-like $\beta$-wollastonite crystals precipitate and extend from the surface of the small mass in a direction perpendicular to the small mass surface. Then, the outer surface of the integral body was polished and a crystallized article was produced with a beautiful surface pattern. The surface pattern comprises small areas of the crystallized glass defined by the small masses and pink lines enclosing the small areas and defined by the pigment dispersed in the interfaces of the fusion-bonded small masses.

EXAMPLE 2

From a glass batch similar to Example 1, small masses having various particle sizes of 3–7 mm were prepared in the manner similar to Example 1. The small masses were mixed with Al-Co-Cr-Zn spinel pigment of 1 wt % and water 1 wt % on the weight base of the small masses in a mixer for about 5 minutes. The mixture was put into a mold with alumina powder coating and was heat-treated at 1100° C. for one hour, following which cooling was conducted. Thus, an integral body of the small masses fusion-bonded to each other was obtained with needle-like $\beta$-wollastonite crystals precipitated in each small mass. After polishing a surface of the integral body, a crystallized glass article was produced with a beautiful appearance comprising blue lines and marble-like white areas enclosed by the blue lines.

EXAMPLE 3

A glass batch consisted of $SiO_2$ 61.6 wt %, $Al_2O_3$ 4.6 wt. %, CaO 12.9 wt %, $K_2O$ 1.2 wt %, $Na_2O$ 4,5 wt %, $B_2O_3$ 0.5 wt %, ZnO 6.3 wt %, BaO 4.0 wt %, $Fe_2O_3$ 4.0 wt %, and CoO 0.3 wt %. The glass batch was melted at 1400°–1500° C. and poured into water to prepare small masses having various particle sizes of 3–7 mm. After the small masses were dried, the small masses were mixed with Fe-Cr-Zn-Al spinel pigment of 3 wt % and water 1 wt % in a mixer for about 5 minutes. The mixture was put into a mold with alumina powder coating and heat-treated at 1080° C. for one hour so as to form an integrated body wherein the small masses were fusion bonded together and needle-like $\beta$-wollastonite crystals were precipitated in each small mass. After cooling was conducted, a surface of the integrated body was polished and a crystallized article was obtained with a beautiful surface pattern comprising gold lines and black areas enclosed by the gold lines.

EXAMPLE 4

A plurality of accumulations of small masses prepared by the similar manner as in Example 2 were mixed with powders of NiO, $MnO_2$, CoO, $Fe_2O_3$, $Cr_2O_3$, spinel of Zn-Cr-Ni-Al oxide, zircon of Zr-Si-Pr oxide, zircon of Zr-Si-V-Pr oxide, zircon of Zr-Si-V oxide, spinel of Al-Zn-Fe-Cr oxide, spinel of Fe-Cr-Zn oxide, and spinel of Fe-Cr-Ni-Mn oxide, respectively, together with water and were heat-treated to thereby obtains crystallized articles of integral bodies, respectively, in the similar manner in Example 2, each of which articles has a beautiful appearance. The appearance comprising a colored lines and marble-like white areas enclosed by the colored lines. The colored lines were green, black, black, brown, green, green, yellow, green, blue, brown, brown, and black for use of pigment powders of NiO, $MnO_2$, CoO, $Fe_2O_3$, $Cr_2O_3$, spinel of Zn-Cr-Ni-Al oxide, zircon of Zr-Si-Pr oxide, zircon of Zr-Si-V-Pr oxide, zircon of Zr-Si-V oxide, spinel of Al-Zn-Fe-Cr oxide, spinel of Fe-Cr-Zn oxide, and spinel of Fe-Cr-Ni-Mn oxide, respectively.

What is claimed is:

1. A method for producing a crystallized glass article having a colored surface pattern which comprises the steps of:
   preparing small masses of glass which essentially consists of $SiO_2$-$Al_2O_3$-CaO-ZnO glass to precipitate $\beta$-wollastonite crystals in the shape of a needle therein with softening and deformation by heat-treating at a heat treating temperature higher than the softening point of the glass;
   preparing a mixture of said small masses and coloring agent powders by mixing together with water;
   heat-treating said mixture in a mold at said heat treating temperature until said $\beta$-wollastonite crystals are present in each of said small masses to thereby make said small masses into crystallized small masses and said crystallized small masses are fusion-bonded along interfaces there-between to form an integral body, said coloring agent powders maintaining dispersed in the interfaces whereby said colored surface pattern is present defined by the crystallized small masses forming the surface layer and a color of the coloring agent.

2. A method as claimed in claim 1, wherein said coloring agent comprises at least one selected from the group consisting of NiO, which is green, $MnO_2$, which is black, CoO, which is black, $Fe_2O_3$, which is brown, and $Cr_2O_3$, which is green, spinel of Zn-Cr-Ni-Al oxide having grey color, sphene of Sn-Si-Ca-Cr-Zn oxide having pink color, zircon of Zr-Si-Pr oxide having yellow color, zircon of Zr-Si-V-Pr oxide having green color, zircon of Zr-Si-V oxide having blue color, spinel of Al-Co-Cr-Zn oxide having blue color, spinel of Al-Zn-Fe-Cr oxide having brown color, spinel of Fe-Cr-Zn-Al oxide having gold color, spinel of Fe-Cr-Zn oxide having brown color, and spinel of Fe-Cr-Ni-Mn oxide having black color.

3. A method as claimed in claim 1, wherein an amount of said coloring agent is 0.1–10% of the weight of the small masses.

4. A method as claimed in claim 3, wherein an amount of said water is 0.1–5% of the weight of the small masses.

5. A method as claimed in claim 2, wherein
   said spinel of Zn-Cr-Ni-Al oxide is essentially $ZnO.Cr_2O_3$ and, $ZnO.Al_2O_3$ with Ni, said spinel of Fe-Cr-Zn-Al oxide essentially consisting of $ZnO.Fe_2O_3$, $ZnO.Cr_2O_3$, and $ZnO.Al_2O_3$, said spinel of Fe-Cr-Zn oxide essentially consisting of $ZnO.Cr_2O_3$, and $ZnO.Fe_2O_3$ and is brown, said spinel of Fe-Cr-Ni-Mn oxide essentially consisting of $MnO.Fe_2O_3$ and $NiO.Cr_2O_3$ and is black, said sphene of Sn-Si-Ca-Cr-Zn oxide essentially consisting of $CaO.SnO_2.SiO_2$ with $Cr_2O_3$ and ZnO, said zircon of Zr-Si-Pr oxide essentially consisting of $ZrO_2.SiO_2$ with $Pr_6O_{11}$, said zircon of Zr-Si-V-Pr oxide essentially consisting of $ZrO_2.SiO_2$ with $V_2O_5$ and $Pr_6O_{11}$, said zircon of Zr-Si-V oxide essentially consisting of $ZrO_2.SiO_2$ with $V_2O_5$, said spinel of Al-Co-Cr-Zn oxide essentially consisting of $CoO.Al_2O_3$ and $ZnO.Cr_2O_3$, said spinel of Al-Zn-Fe-Cr oxide essentially consisting of $ZnO.Al_2O_3$, $ZnO.Cr_2O_3$ and $ZnO.Fe_2O_3$.

6. A method as claimed in claim 1, wherein said needle-like $\beta$-wollastonite crystals extend from the surface of said small mass into the interior thereof in a direction generally perpendicular to said surface of the mass softening and deformation by heat-treating at said heat treating temperature.

* * * * *